S. G. F. HAAS.
METER.
APPLICATION FILED JULY 25, 1917.

1,256,687

Patented Feb. 19, 1918.
2 SHEETS—SHEET 1.

WITNESSES

INVENTOR
SIDNEY G. F. HAAS,
BY
ATTORNEYS

S. G. F. HAAS.
METER.
APPLICATION FILED JULY 25, 1917.

1,256,687.

Patented Feb. 19, 1918.
2 SHEETS—SHEET 2.

WITNESSES:

INVENTOR.
SIDNEY G. F. HAAS,
BY
ATTORNEYS.

UNITED STATES PATENT OFFICE.

SIDNEY GEORGE FRANK HAAS, OF NEW ORLEANS, LOUISIANA.

METER.

1,256,687.　　　　Specification of Letters Patent.　　Patented Feb. 19, 1918.

Application filed July 25, 1917. Serial No. 182,773.

*To all whom it may concern:*

Be it known that I, SIDNEY G. F. HAAS, a citizen of the United States, and a resident of New Orleans, in the parish of Orleans and State of Louisiana, have invented new and useful Improvements in Meters, of which the following is a specification.

My invention is an improvement in meters, and has for its object the application to water, electric and other meters of an epicyclic train of gears of small diameter, few teeth and differing but slightly in the number of teeth. This epicyclic train is to be used wherever and whenever it is necessary or expedient to greatly reduce the speed of the moving or measuring member and transfer this proportionally reduced speed to the recording or registering mechanism. The epicyclic train is to replace the ordinary train of gears of usually very different sizes and greatly different numbers of teeth to obtain the same reduction in speed.

The accompanying drawings are intended only to illustrate the general idea of the application of the epicyclic train and it is not intended that the method of construction be followed as the construction of different meters of the same type or different types of meters may vary very materially.

In the drawings:

Figure 1 is a sectional view through a water meter showing one form of construction and application of the epicyclic train;

Figs. 2 and 3 are diagrammatic sections taken substantially on the lines 2—2 and 3—3, respectively, of Fig. 1;

Figure 1:
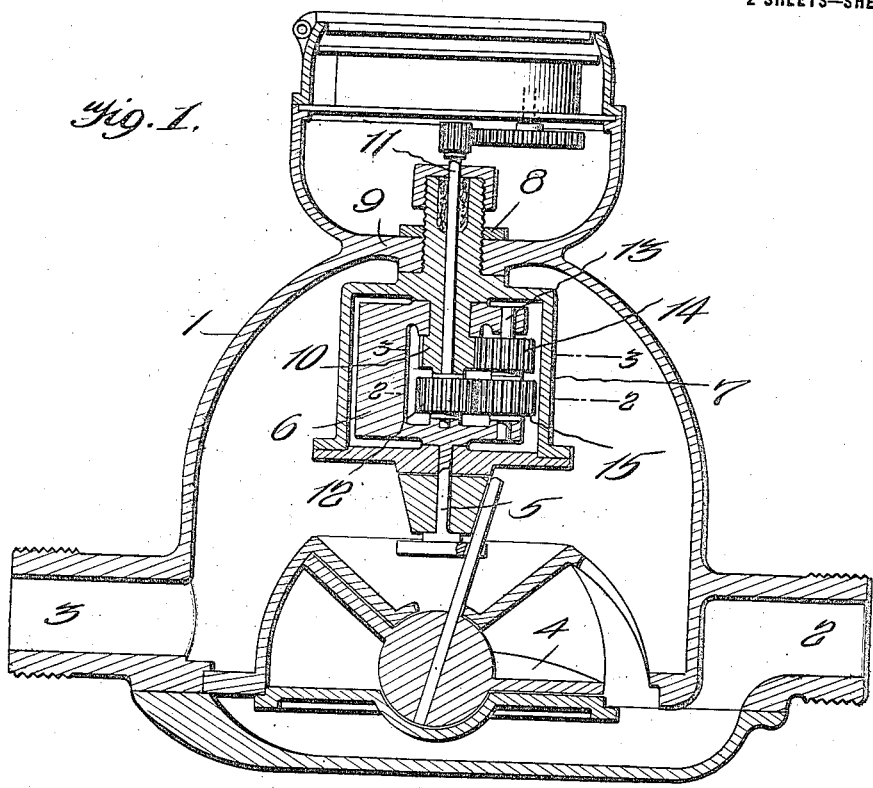
Figure 2:
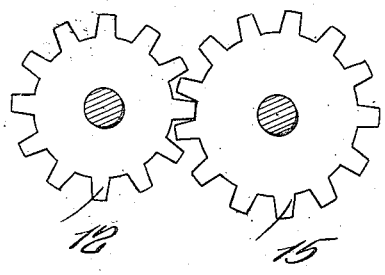
Figure 3:
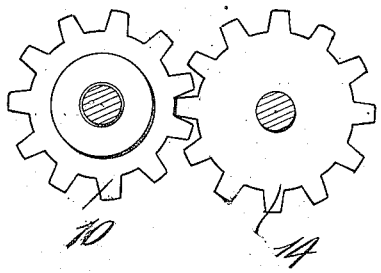

Referring more particularly to Fig. 1, the casing 1 has an outlet 2 and an inlet 3 for the water which drives the meter 4, which operates a shaft 5 connected to a yoke 6, which is mounted within a casing or frame 7 rigid with the casing 1. This casing or frame 7 has a hub extension 8 at its upper end which passes through the partition 9 that divides the water chamber of the casing from the recording chamber, the said extension being threaded through an opening in the partition, and the extension also extends into the casing or frame 7 through the upper arm of the yoke, and has integral therewith a gear wheel 10 within the casing.

The shaft 11 which operates the recording mechanism is journaled in this hub extension, and a gear wheel 12 is secured to the lower end of the shaft. The lower end of the shaft 11 is journaled in the lower arm of the yoke 6, in alinement with the shaft 5 which is rigid with the said arm of the yoke. A countershaft 13 is journaled in the arms of the yoke parallel with the shaft 11, and gear wheels 14 and 15 are secured to this countershaft, thus having to revolve together at the same speed, and meshing with the gear wheels 10 and 12, respectively. The reduction in speed is obtained by the four gears. As arranged in Fig. 1, if the gear wheel 10 has eleven teeth, the gear wheels 12 and 14 have twelve teeth each, and the gear wheel 15 has thirteen teeth, a reduction of one hundred forty-four to one is obtained. It will be obvious, however, that with different ratios any desired reduction may be obtained.

In operation, when the shaft 5 is rotated by the motor, the yoke 6 is rotated about the shaft 11. Since the gear wheel 10 is fixed, the countershaft 13 will be rotated through the engagement of the gear wheels 10 and 14 and the gear wheel 15 will rotate the gear wheel 12, and drive the shaft 11 and operate the recording mechanism.

Figure 4:
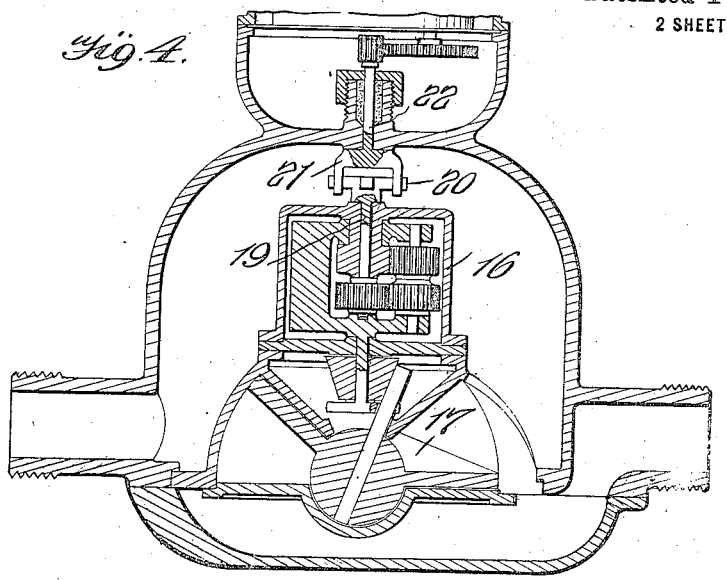
Fig. 4 is also a sectional view through a water meter showing a slightly different arrangement of construction, but is essentially the same as Fig. 1.

Referring to Fig. 4, it will be noticed that the yoke or frame 16 corresponding to 7 of Fig. 1 is supported on the chamber of the motor 17. The top of the shaft 19, corresponding to 11 of Fig. 1, ends in a cross 20 which engages a fork 21. This fork 21 is fastened to the shaft 22 which engages the recording mechanism. The operation is as previously described.

Figure 5:
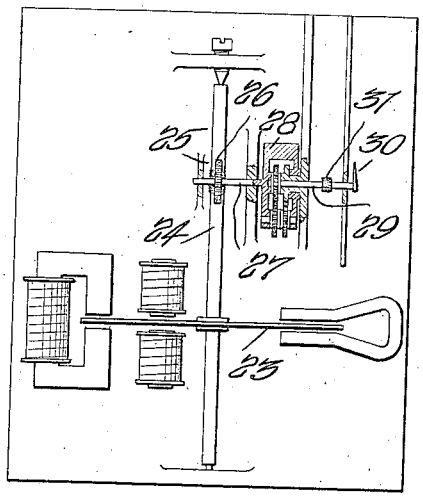
Fig. 5 shows one form of application of the epicyclic train to an electric watt hour meter.

Referring now to Fig. 5, 23 fastened to the shaft 24 represents the revolving disk of an electric watt hour meter. On the shaft 24 there is a worm 25 which engages a worm wheel 26 fastened to a shaft 27. The yoke 28 carrying the gears in a manner similar to 6 of Fig. 1 is also fastened to the shaft 27 and revolves with it, thus causing the operation of the epicyclic train and consequently reduced speed of the shaft 29 exactly as previously described. The shaft 29 carries the pointer 30 of the lowest dial of the register. The other dials are operated off the shaft 29 through the pinion 31 in the usual manner.

I claim:

In a meter, the combination with the recording mechanism and the driving means operated by the flow of the water through the meter, of means connecting the operating means with the recording means for driving the same, said means comprising a sleeve, a shaft mounted in the sleeve and connecting at one end to the recording mechanism for operating the same, a yoke having arms, one of which is journaled on the sleeve and the other of which is engaged by the driving means for rotating the yoke about the shaft, gear wheels on the sleeve and on the shaft adjacent to each other, a countershaft journaled in the arms of the yoke and carrying gear wheels meshing with the first named wheels and rigid with each other.

SIDNEY GEORGE FRANK HAAS.

Witnesses:
GEO. MCLEAN.
H. J. JANSSEN.